United States Patent [19]

Rockey

[11] Patent Number: 4,606,445
[45] Date of Patent: Aug. 19, 1986

[54] FLUID COUPLING DEVICE WITH IMPROVED FLUID COOLING CAPABILITY

[75] Inventor: Carl E. Rockey, Marshall, Mich.

[73] Assignee: Eaton Corporation, Cleveland, Ohio

[21] Appl. No.: 651,967

[22] Filed: Sep. 19, 1984

[51] Int. Cl.$^4$ .................. F16D 35/00; F16D 13/72; F16D 43/25

[52] U.S. Cl. .................. 192/58 B; 192/82 T; 192/113 B

[58] Field of Search .............. 192/82 T, 58 B, 58 R, 192/58 A, 113 B

[56] References Cited

U.S. PATENT DOCUMENTS

| | | | |
|---|---|---|---|
| 3,055,473 | 9/1962 | Oldberg et al. | 192/58 B |
| 3,191,733 | 6/1965 | Weir | 192/58 B |
| 3,339,689 | 9/1967 | Sataruk | 192/58 B |
| 3,363,734 | 1/1968 | Sabat | 192/58 B |
| 3,419,122 | 12/1968 | Connelly | 192/58 B |
| 3,630,331 | 12/1971 | Bradbury | 192/82 T X |
| 3,840,101 | 10/1974 | Peter et al. | 192/58 B |
| 4,007,819 | 2/1977 | Maci | 192/58 B |
| 4,133,417 | 1/1979 | Glasson et al. | 192/58 B |

Primary Examiner—Rodney H. Bonck
Assistant Examiner—Richard M. Lorence
Attorney, Agent, or Firm—C. H. Grace; L. J. Kasper

[57] ABSTRACT

A fluid coupling device is disclosed of the type including an input coupling member (11) and an output coupling member (13). A valve plate (31) separates the device into a fluid operating chamber (33) and a fluid reservoir chamber (35). In a preferred embodiment, the valve plate defines an inlet port (53) and a discharge port (59), which are conventional, and, in accordance with the invention, a discharge port (55) is disposed adjacent a pumping element (57). Attached to the valve plate is a temperature-responsive bimetallic strip (63) having a closed position when the fluid temperature is below a predetermined maximum, such that the device operates in the engaged mode. When the fluid temperature rises above the predetermined maximum, the bimetallic strip (63) opens, permitting additional discharge flow through the port (55), causing the device to operate in the disengaged mode, and preventing overheating of the fluid and damage to the coupling device.

7 Claims, 5 Drawing Figures

FLUID COUPLING DEVICE WITH IMPROVED FLUID COOLING CAPABILITY

BACKGROUND OF THE DISCLOSURE

The present invention relates to fluid coupling devices, and more particularly, to such devices which are capable of changing between the engaged and disengaged conditions, in response to variations in a predetermined temperature condition.

A fluid coupling device of the type to which the present invention relates typically includes an input coupling member and an output coupling member. The output coupling member cooperates with a cover assembly to define a fluid chamber, and a valve plate separates the chamber into a reservoir chamber and an operating chamber. The input coupling member is rotatably disposed in the operating chamber, and cooperates with the output coupling member to define a viscous shear space, such that torque may be transmitted from the input member to the output member by means of a viscous shear fluid.

The valve plate includes a valving arrangement operable in response to variations in temperature to permit fluid to flow from the reservoir, through the valve plate inlet port into the operating chamber. Typically, such fluid couplings include a discharge port defined by the valve plate and disposed near the outer periphery of the operating chamber, with some form of pumping element, such that a small quantity of fluid is continually pumped from the operating chamber back to the reservoir chamber during normal operation.

Among the problems associated with devices of the type described is the necessity to dissipate heat which is generated as the speed of the input coupling member increases, and the rate of shearing of the viscous fluid increases. In conventional fluid coupling devices, there has been no protection provided to prevent damage to the fluid and the coupling device as the input speed and the fluid temperature increase.

With the advent of smaller automobile engines, operating at relatively higher speeds and temperatures, it becomes increasingly common for the temperature of the fluid in the coupling device to exceed a predetermined maximum temperature. When this occurs, the silicon fluid typically used in such coupling devices undergoes a process in which the fluid "gelatinates". In this process, the fluid first "droops", i.e., there is a physical breakdown of the polymer chains such that the fluid viscosity decreases and the torque transmitting capability of the device decreases substantially. Then, with continued excess fluid temperature, the fluid again begins to cross-link, but does so excessively, and eventually "gels" or becomes almost solid. When the fluid reaches this condition, the coupling device operates as if it were solid, with no slip speed in the engaged mode, and no capability of operating in a disengaged mode.

SUMMARY OF THE INVENTION

Accordingly, it is an object of the present invention to provide a fluid coupling device of the type described, including means to prevent overheating and gelatinization of the fluid.

It is a more specific object of the present invention to provide a fluid coupling device which accomplishes the above-stated object by effecting operation of the coupling device into a disengaged mode whenever the fluid temperature reaches a predetermined maximum.

The above and other objects of the present invention are accomplished by the provision of an improved fluid coupling device characterized by a temperature-responsive valve member disposed in either the fluid operating chamber or the fluid reservoir chamber and being operatively associated with the valve plate and the fluid discharge port. The temperature-responsive valve member is movable, in response to changes in the temperature of the fluid in the fluid chamber, between a first position in which the valve member restricts the flow of fluid through the discharge port when the fluid temperature is less than a predetermined maximum, and a second position in which the valve member permits relatively unrestricted flow of fluid through the discharge port when the fluid temperature is greater than the predetermined maximum. As a result, fluid flows from the operating chamber to the reservoir chamber to reduce the temperature of the fluid.

DESCRIPTION OF THE PREFERRED EMBODIMENTS

Figures 1, 1A:
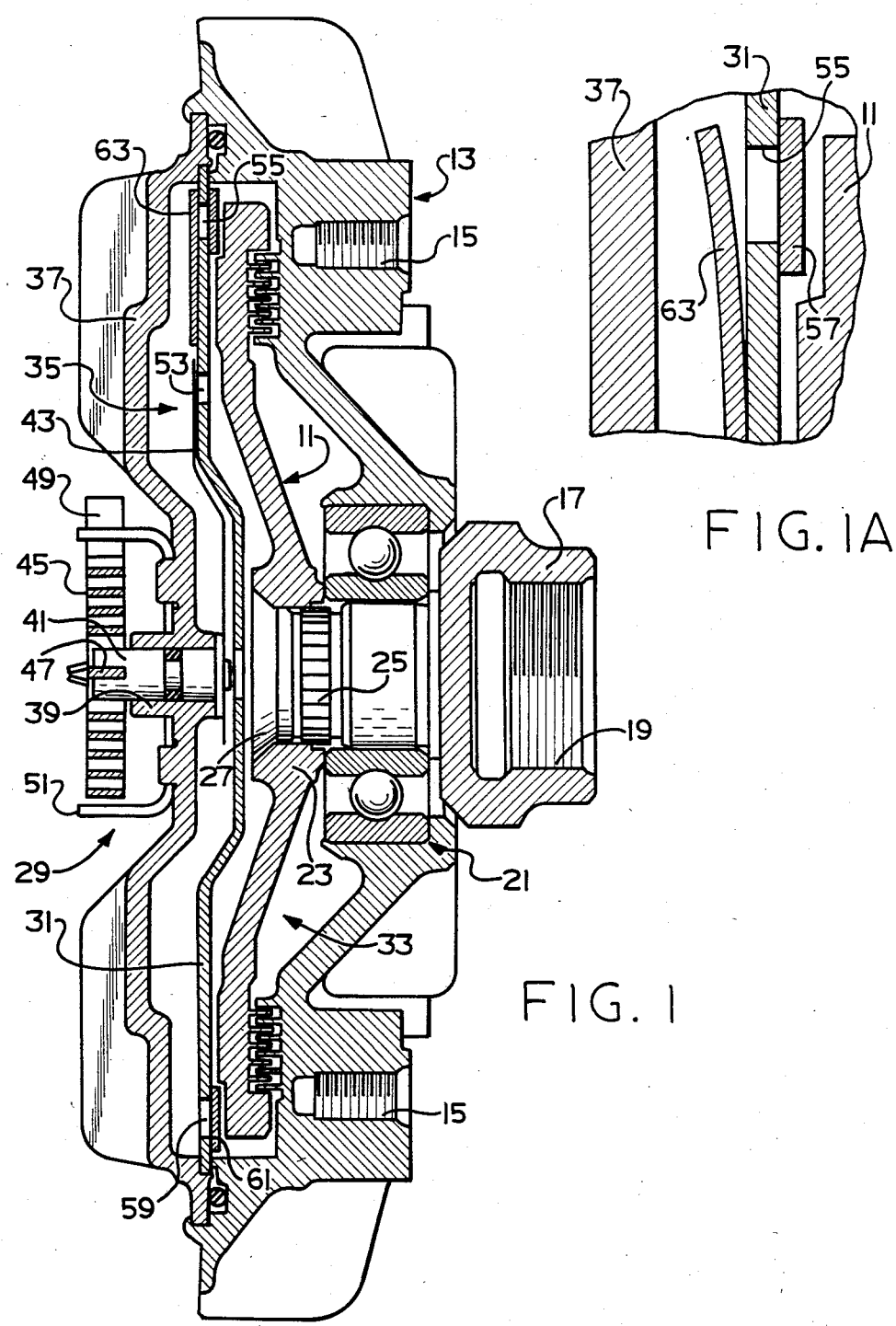
FIG. 1 is an axial cross-section of a typical fluid coupling device utilizing the present invention.
FIG. 1A is an enlarged, fragmentary view, similar to FIG. 1, illustrating the temperature-responsive valve member of the invention in the open position.

Referring now to the drawings, which are not intended to limit the invention, FIG. 1 illustrates one preferred form of a fluid coupling device in which the present invention may be utilized. The fluid coupling device includes an input coupling member 11 and an output coupling member 13. A fluid coupling device as shown in FIG. 1 may be used as a drive for an automotive engine accessory, such as a radiator cooling fan. The fan (not shown) may be bolted to the output coupling member 13 by means of a plurality of threaded bores 15 formed in the member 13. It will be understood, however, that the use of the present invention is not limited to any particular fluid coupling application or configuration, except as specifically noted hereinafter.

The fluid coupling device includes an input shaft 17 on which the input member 11 is mounted. The other end of the input shaft 17 includes an internally threaded portion 19 which typically is in threaded engagement with a shaft that is rotated by the vehicle engine (not shown). The input shaft 17 functions as a support for the inner race of a bearing set 21, which is seated on the inside diameter of the output coupling member 13.

The input coupling member 11 is in the form of an annular disc having a hub portion 23 supported by the forward end of the shaft 17. The hub portion 23 has an opening therethrough which has an interference fit with a serrated portion 25 of the shaft 17. The hub portion 23 is pressed onto the serrated portion 25 until it abuts the side of the inner race of the bearing set 21, and the output end (left end in FIG. 1) of the shaft 17 has a retaining portion 27 for positive retention of the input coupling member 11 on the shaft 17, such that rotation of the shaft 17 causes rotation of the input coupling member 11.

The output coupling member 13 cooperates with a cover assembly, generally designated 29, to define a fluid chamber therebetween, the fluid chamber being separated by a valve plate 31 into a fluid operating chamber 33 and a fluid reservoir chamber 35. The operating chamber 33 comprises the entire volume between the valve plate 31 and the output coupling member 13.

Included as part of the cover assembly 29 is a cast cover member 37 defining a central, cylindrical support portion 39. Rotatably disposed within the portion 39, and supported thereby, is a valve shaft 41, extending outwardly (to the left in FIG. 1). Attached to the inner end of the valve shaft 41 is a valve arm 43, the general construction and operation of which may be better understood by reference to U.S. Pat. No. 3,055,473, which is incorporated herein by reference.

Attached to the outer end of the valve shaft 41 is a bimetallic coil 45, including an inner end 47 received within a slot formed in the outer end of the valve shaft 41, and an outer end 49 received by a bracket member 51. The bracket member 51 is attached to the cover member 37, such as by welding or crimping, such that the outer end 49 of the bimetallic coil 45 is fixed relative to the cover member 37. The manner in which the bimetallic coil 45 operates to control the movement of the valve arm 43 is well known in the art, is not an essential feature of the present invention, and therefore will not be described further.

Referring still to FIG. 1, the valve plate 31 defines a fluid inlet port 53 (shown only in FIG. 1). With the valve arm 43 in the position shown in FIG. 1, fluid flow from the reservoir chamber 35 through the inlet port 53, and into the operating chamber 33 is blocked (disengaged mode). However, when the valve arm 43 moves to a position uncovering the inlet port 53, fluid is permitted to flow through the inlet port 53 into the operating chamber 35 (engaged mode), as is well known in the art.

Figure 2:
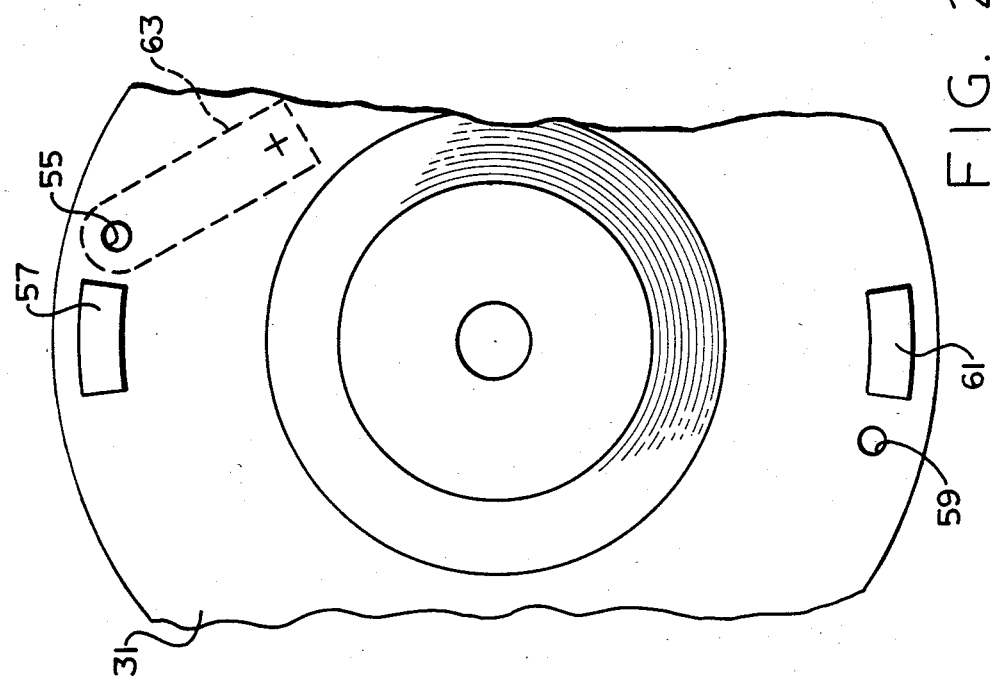
FIG. 2 is a fragmentary, plan view, on a slightly smaller scale than FIG. 1, illustrating a preferred embodiment of the present invention.

Referring now to FIG. 2, in conjunction with FIGS. 1 and 1A, it may be seen that disposed adjacent the outer periphery of the operating chamber 33 is a fluid discharge port 55. Disposed adjacent the discharge port 55 is a pumping element 57, operable to engage the relatively rotating fluid and generate a region of relatively higher fluid pressure. This generated region of higher pressure continually pumps a small quantity of fluid from the operating chamber 33 back into the reservoir chamber 31, as is well known in the art and illustrated and described in greater detail in above-incorporated U.S. Pat. No. 3,055,473.

Referring still to FIGS. 1 and 2, it may be seen that a second fluid discharge port 59 is disposed diametrically about the axis of rotation of the coupling from the discharge port 55. Disposed adjacent the second discharge port 59 is a second pumping element 61 which, like the pumping element 57, is operable to engage the rotating fluid to generate a region of relatively higher pressure fluid, and continually pump a small quantity of fluid from the operating chamber 33 back into the reservoir chamber 35.

In the embodiment of the invention illustrated in FIG. 2, the second fluid discharge port 59 is sized such that, during normal operation of the fluid coupling device in the engaged mode, the flow of fluid through the inlet port 53 into the operating chamber 33 should be capable of exceeding the amount of fluid pumped out through the second discharge port 59, back into the reservoir chamber 35. The reason for the above-described selection of the second discharge port 59 is that, in accordance with one aspect of the present invention, a temperature-responsive, bimetallic strip 63 is attached, such as by welding, to the valve plate 31. Although the bimetallic strip 63 may be disposed in either the operating chamber 33 or the reservoir 35, it is preferably disposed in the reservoir chamber 35 for reasons which will be described subsequently.

During normal operation, the bimetallic strip 63 is disposed in the closed position illustrated in FIG. 1, blocking flow from the operating chamber 33 through the fluid discharge port 55, into the reservoir chamber 35. Therefore, during normal operation of the fluid coupling device, the only flow of fluid from the operating chamber 33 to the reservoir chamber 35 is through the second fluid discharge port 59, thus achieving the normal, engaged mode.

As is well known to those skilled in the art, as the input speed of the shaft 17 and input coupling 11 increases, the speed of the output coupling member 13 (and therefore the fan speed) also increases. However, the rate of increase of the output speed is not as great as the rate of increase of the input speed, with the result that the "slip speed" (input speed minus output speed) increases. The heat generated during operation in the engaged mode is generally proportional to the product of fan torque and slip speed, such that the heat generated, and the temperature of the fluid in the operating chamber 33 increases as the input speed increases, until the fluid temperature reaches a point at which it can gelatinate, as was described in the background of the specification, and the fluid coupling device is rendered unsuitable for its desired operation.

Figure 4:
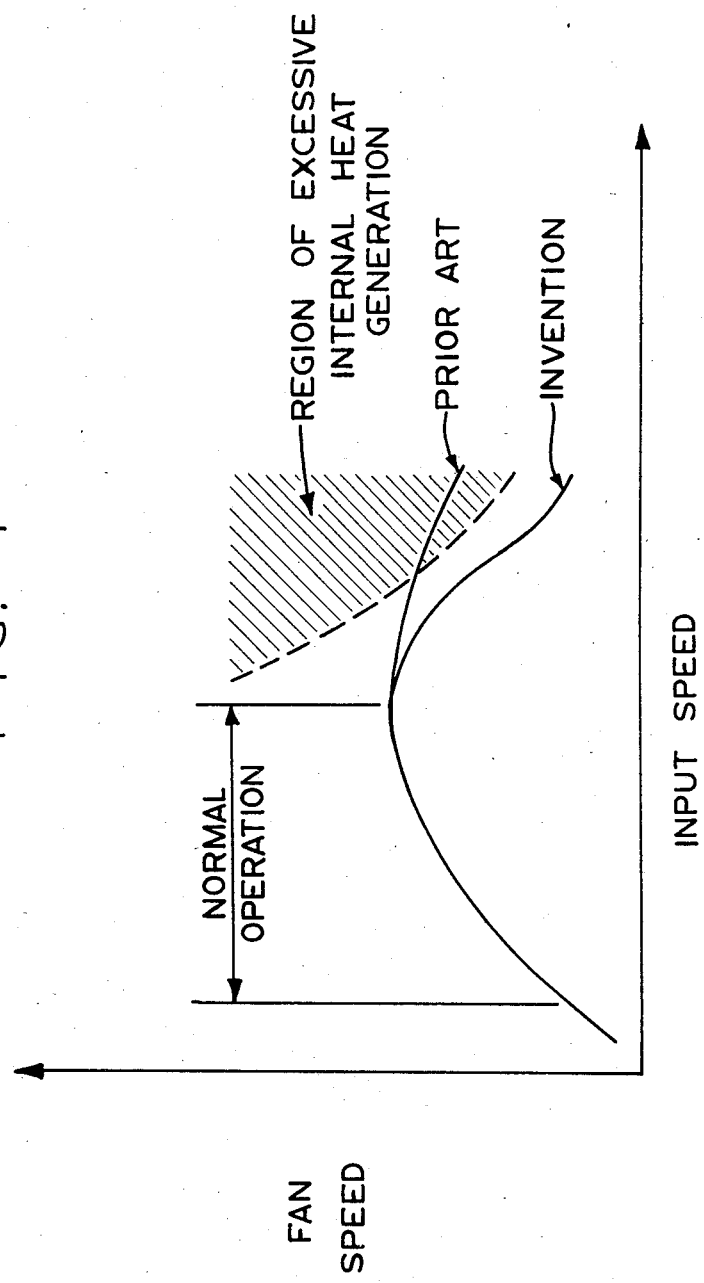
FIG. 4 is a graph illustrating fan speed versus input speed, with and without the present invention.

Referring now to FIG. 4, the operation and effect of the present invention will be described. The bimetallic strip 63 is designed and selected such that it will remain in the closed position (as shown in FIG. 1) as long as the temperature of the fluid is below a predetermined maximum, i.e., such that the fluid coupling device is operating below the REGION OF EXCESSIVE INTERNAL HEAT GENERATION ("REGION") shown in the graph of FIG. 4. As the temperature of the fluid approaches the REGION, the bimetallic strip 63 begins to open (FIG. 1A), uncovering the fluid discharge port 55. This has the effect of making the total discharge port flow (ports 55 and 59) substantially greater than the flow through the fluid inlet port 53. The result is that the pump out rate (rate of flow from the operating chamber 33 to the reservoir chamber 35) becomes greater than the inlet flow rate (fill rate), and the coupling device returns to a disengaged mode, regardless of the temperature being sensed by the bimetallic coil 45, and regardless of the position of the valve arm 43. In effect, the bimetallic strip 63 may be considered an "override" control in that the strip 63 overrides the coil 45 causing the coupling device to return to a disengaged mode, to protect the coupling device from damage.

Referring still to FIG. 4, it should be noted that a prior art device, not including the override control of the present invention, would, during its normal operation, cross into the REGION, whereas a fluid coupling device including the present invention can be tailored to operate below the REGION and avoid damage to the fluid and the coupling. It should be noted that the temperature-responsive bimetallic strip 63 (override control) of the present invention is responsive strictly to temperature, although for ease of illustration, FIG. 4 is a graph of fan speed versus input speed because, during normal operating conditions, such a graph is representative of heat generation as described previously.

Figure 3:
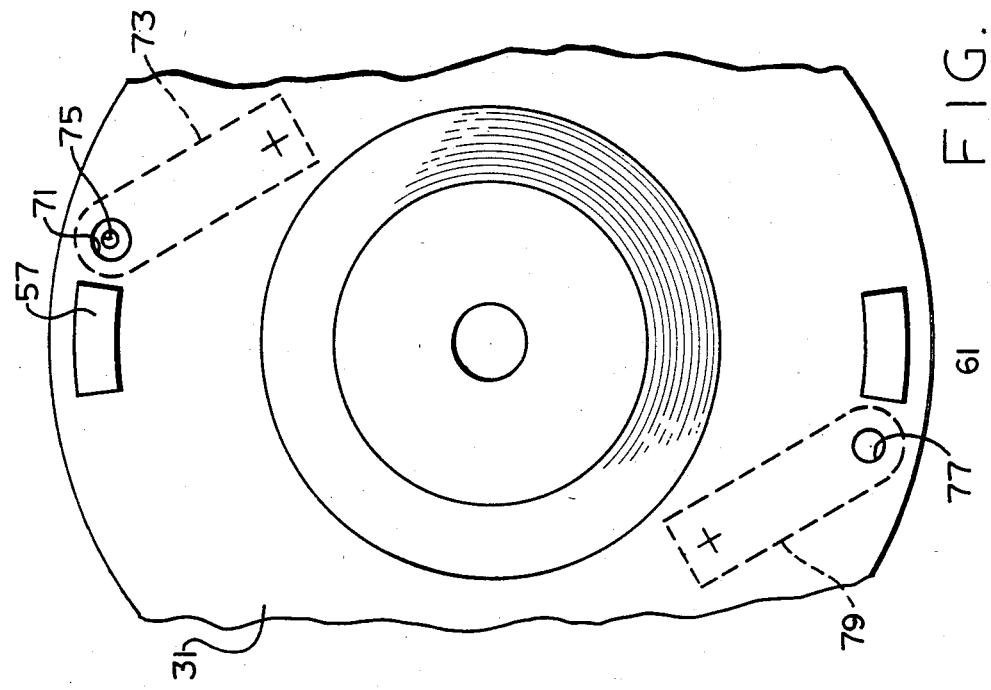
FIG. 3 is a fragmentary, plan view, similar to FIG. 2, illustrating an alternative embodiment of the present invention.

Referring now to FIG. 3, in conjunction with FIG. 1, there is illustrated an alternative embodiment of the present invention. In FIG. 3, disposed adjacent the outer periphery of the operating chamber 33 is a fluid discharge port 71, adjacent the pumping element 57, and able to cooperate therewith in the manner described in connection with FIG. 2. A temperature-responsive, bimetallic strip 73 is attached to the valve plate 31, and differs from the strip 63 of FIG. 2 only to the extent that the bimetallic strip 73 defines a second fluid discharge port 75 which corresponds to the second fluid discharge port 59 of the FIG. 2 embodiment. During normal operation, with the bimetallic strip 73 in the closed position (in the same manner as shown in FIG. 1), the rate of fluid flow through the inlet port 53 into the operating chamber 33 should be capable of exceeding the amount of fluid pumped out through the second discharge port 75, back into the reservoir chamber 35 (engaged mode).

When the temperature of the fluid reaches the predetermined maximum temperature, the bimetallic strip 73 opens (in the same manner as shown in FIG. 1A), thus uncovering the fluid discharge port 71 defined by the valve plate 31. Preferably, the discharge port 71 should be sized such that the pump out rate is greater than the inlet flow rate and the coupling device can return to a disengaged mode.

In the FIG. 3 embodiment, but not a necessary part of the FIG. 3 embodiment, a third fluid discharge port 77 is disposed diametrically about the axis of rotation of the coupling from the discharge port 71, and is disposed adjacent the second pumping element 61. Attached to the valve plate 31 is a second temperature-responsive, bimetallic strip 79, which is disposed to cover the third discharge port 77. Although the strip 79 may be similar in appearance to the strip 73, may be mounted in the same manner, etc., its purpose is quite different than the strip 73. The bimetallic strip 79 is selected and designed, as is well known in the art, to be in an open position, uncovering the port 77, when the temperature of the fluid in the reservoir chamber 35 is below a predetermined minimum temperature to avoid "cold-start" problems, i.e., to prevent the fluid coupling device from excessive operation in the engaged mode when the vehicle engine is first started. The discharge port 77 and bimetallic strip 79 are designed and selected to insure that during the cold-start condition, the coupling device achieves the disengaged operating mode as quickly as possible. After the fluid in the reservoir chamber 35 has reached the predetermined minimum temperature, the strip 79 moves to a closed position, blocking discharge flow through the port 77, and thereafter, with increasing fluid temperature, all discharge of fluid during normal operation (in either the engaged or disengaged mode) is through the second fluid discharge port 75.

As was noted previously, the bimetallic strips 63 and 73 could be in either the operating chamber 33 or reservoir chamber 35. However, if the strips 63 and 73 were located in the operating chamber 33, it would be necessary for the strips to overcome the flow forces exerted by the fluid in order to move from the closed position to the open position, such that the strips 63 and 73 would probably require a greater change in fluid temperature to move from the closed position to the open position. Instead, by having the strips in the reservoir chamber 35, the flow forces exerted by the fluid actually assist the strips 63 and 65 in moving from the closed position to the open position.

Although the present invention is illustrated in connection with a fluid coupling device of the type in which the valve arm 43 moves in response to a bimetallic coil, mounted on the coupling device, it should be understood that the invention may also be used advantageously on a coupling device in which the valve means which controls the flow of fluid through the inlet port 53 is controlled by other means. For example, there could be a remote temperature-sensing arrangement to control the movements of the valve member to either cover or uncover the inlet port 53, and the actual movement of the valve member could be controlled pneumatically (either pressure or vacuum), or by an electromagnetic coil, or by any other means, and all such types of valving and actuation in response to varying temperature conditions are included within the present invention, insofar as they come within the scope of the appended claims.

Also the present invention could be incorporated in a fluid coupling device which does not have an external temperature-responsive device and would normally always remain in an engaged mode.

I claim:

1. A fluid coupling device of the type including a first rotatable coupling member, cover means associated with said first member to define a fluid chamber therebetween, a valve plate disposed to separate said fluid chamber into a fluid operating chamber and a fluid reservoir chamber, a second rotatable coupling member disposed in said fluid operating chamber and being rotatable relative to said first member, said valve plate defining a fluid inlet opening adapted to permit the flow of fluid from said reservoir chamber to said operating chamber, temperature-responsive valve means operatively associated with said fluid inlet opening to control the flow of fluid therethrough in response to variations in a predetermined temperature condition, said valve plate defining a first fluid discharge opening adapted to permit the flow of fluid from said operating chamber to said reservoir chamber; characterized by:
(a) a temperature-responsive valve member disposed in one of said fluid operating chamber and said fluid reservoir chamber and being operatively associated with said valve plate and said first fluid discharge opening;
(b) said temperature-responsive valve member being movable, in response to changes in the temperature of the fluid in said operating and reservoir chambers, between a first position in which said valve member restricts the flow of fluid through said first discharge opening when said fluid temperature is less than a predetermined maximum temperature, and a second position in which said valve member permits relatively unrestricted flow of fluid through said first discharge opening when said fluid temperature is greater than said predetermined maximum temperature, whereby fluid flows from said operating chamber to said reservoir chamber to reduce the temperature of the fluid.

2. A fluid coupling device as claimed in claim 1 characterized by a pumping element operatively associated with said first discharge opening and operable to pump fluid therethrough in response to a difference in the rotational speeds of said first and second coupling members.

3. A fluid coupling device as claimed in claim 1 characterized by said temperature-responsive valve member being disposed in said reservoir chamber.

4. A fluid coupling device as claimed in claim 1 characterized by said valve plate defining a second fluid discharge opening and a second pumping element operatively associated with said second discharge opening and operable to pump fluid therethrough in response to a difference in the rotational speeds of said first and second coupling members.

5. A fluid coupling device as claimed in claim 1 characterized by said valve plate defining a second fluid discharge opening adapted to permit the flow of fluid from said operating chamber to said reservoir chamber, and a second temperature-responsive valve member disposed in one of said operating chamber and said reservoir chamber and being operatively associated with said valve plate and said second fluid discharge opening.

6. A fluid coupling device as claimed in claim 5 characterized by said second temperature-responsive valve member being movable, in response to changes in the temperature of the fluid in said fluid chamber, between a first position in which said second valve member restricts the flow of fluid through said second discharge opening when said fluid temperature is greater than a predetermined minimum temperature, and a second position in which said second valve member permits relatively unrestricted flow of fluid through said second discharge opening when said fluid temperature is less than said predetermined minimum temperature.

7. A fluid coupling device of the type including a first rotatable coupling member, cover means associated with said first member to define a fluid chamber therebetween, a valve plate disposed to separate said fluid chamber into a fluid operating chamber and a fluid reservoir chamber, a second rotatable coupling member disposed in said fluid operating chamber and being rotatable relative to said first member, said valve plate defining a fluid inlet opening adapted to permit the flow of fluid from said reservoir chamber to said operating chamber, said valve plate defining a first fluid discharge opening adapted to permit the flow of fluid from said operating chamber to said reservoir chamber; characterized by:

(a) a temperature-responsive valve member disposed in one of said fluid operating chamber and said fluid reservoir chamber and being operatively associated with said valve plate and said first fluid discharge opening;

(b) said temperature-responsive valve member being movable, in response to changes in the temperature of the fluid in said operating and reservoir chambers, between a first position in which said valve member restricts the flow of fluid through said first discharge opening when said fluid temperature is less than a predetermined maximum temperature, and a second position in which said valve member permits relatively unrestricted flow of fluid through said first discharge opening when said fluid temperature is greater than said predetermined maximum temperature, whereby fluid flows from said operating chamber to said reservoir chamber to reduce the temperature of the fluid.

* * * * *